United States Patent Office
3,183,249
Patented May 11, 1965

3,183,249
DIEPOXIDES OF BUTADIENE CYCLOPENTA-
DIENE CODIMERS
Herbert K. Wiese, Cranford, N.J., assignor to Esso Research and Engineering Company, a corporation of Delaware
No Drawing. Filed Mar. 5, 1959, Ser. No. 797,340
2 Claims. (Cl. 260—348)

The present invention relates to new compositions of matter and to methods of preparation of these new compositions of matter. More particularly, this invention relates to the preparation of bicyclo (4,3,0)-2,6-nonadiene, 2-vinylbicyclo (2,2,1)-5-heptene and the diepoxides of these compounds, 2,3-5,6-diepoxy bicyclo (4,3,0) nonane, 2-(1,2 epoxyethane)-5,6-epoxybicyclo (2,2,1) heptane and 2-vinyl-5,6-epoxybicyclo (2,2,1) heptane. These new compositions of matter can be represented by the following formulas:

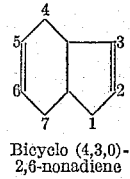
Bicyclo (4,3,0)-
2,6-nonadiene

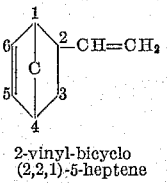
2-vinyl-bicyclo
(2,2,1)-5-heptene

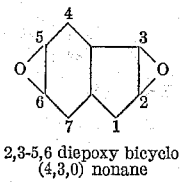
2,3-5,6 diepoxy bicyclo
(4,3,0) nonane

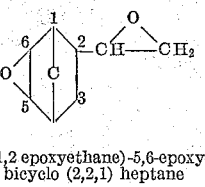
2-(1,2 epoxyethane)-5,6-epoxy-
bicyclo (2,2,1) heptane

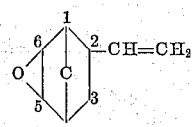
2-vinyl-5,6-epoxy bicyclo (2,2,1) heptane

It has now been found that butadiene and cyclopentadiene can be codimerized to a mixture of bicyclo (4,3,0)-2,6-nonadiene and 2-vinyl bicyclo (2,2,1)-5-heptene. These codimers are unknown in the art and their preparation from these materials is surprising in that butadiene and cyclopentadiene separately readily dimerize respectively to 4-vinyl cyclohexene and to dicyclopentadiene. It would therefore be expected that merely the dimers of each compound would be formed. Since this is not the case it appears that the codimers of this invention must be more stable than respectively the dimers of the reactants. Thus butadiene dimer is produced only in small amounts in the present codimerization process and the cyclopentadiene dimer is not produced at all since even when utilizing this dimer as a starting material it is not found in the reaction products.

The materials of this invention are prepared by codimerizing butadiene with cyclopentadiene in a Diels-Alder type reaction. In this reaction cyclopentadiene and butadiene are reacted at temperatures of 100 to 400° C., preferably 150 to 300° C. and at pressures of 2 to 75 atmospheres. Preferably thermal dimerization without a catalyst is used. However, catalysts such as copper or chromium salts that are soluble in the reactants may be used to catalyze the formation of the codimers. In the reaction, it has now been found that the cyclopentadiene dimer, dicyclopentadiene may be utilized rather than cyclopentadiene itself, if desired. By varying the amount of butadiene and cylclopentadiene utilized from stoichiometric amounts of these materials and by varying temperatures utilized either bicyclo-nonadiene or 2-vinyl bicycloheptene can be preferentially produced. Where, for example, 7.1 moles of cyclopentadiene in the form of a dimer is reacted with 6.9 moles of diene at temperatures of 170 to 190° C. for 1½ hours yields may be 40% of the codimers, said codimers consisting of about 65% of bicyclononadiene and 35% of vinyl bicycloheptene. Where it is desired to produce preferentially the bicyclononadiene ratios of cyclopentadiene to butadiene should be in the range of 2 to 10 moles of the former per mole of the latter and temperatures should be between 200 to 300° C. Where a maximum yield of vinyl bicycloheptene is desired ratios of cyclopentadiene to butadiene should be in the range of 1 to 5 moles of the former per mole of the latter and temperatures should be between 150–200° C.

The nonconjugated dienes bicyclo (4,3,0)-2,6-nonadiene and 2-vinyl-bicyclo (2,2,1)-5-heptene are of value as intermediates for the preparation of monoepoxides, diepoxides, dimercaptans, and other polyfunctional compounds. More particularly these compounds will be of particular value when epoxidized to their diepoxide derivatives. Thus it has now been found that these diepoxides have two equally reactive oxirane rings particularly the diepoxide prepared from bicyclo (4,3,0)-2,6-nonadiene and are therefore very desirable as intermediates for making epoxy type resins and as reactive diluents for commercially available epoxy resins. As is well known in the resin art, it is necessary that the materials used for cross-linking in the polymers be materials which have two equally reactive groups. The monoepoxide, 2-vinyl-5,6-epoxy bicyclo (2,2,1) heptane will be useful in the preparation of unsaturated poly ether type polymers, specifically in copolymers with ethylene or propylene oxide. These unsaturated ethers will be useful as synthetic lubricants and as vulcanizable poly ether rubber type materials.

The oxidation of the above materials to the epoxide derivatives thereof may be effected, for example, by treating with an organic peracid such as perbenzoic, peracetic, or monoperphthalic acid. Also, aqueous hydrogen peroxide or acetaldehyde monoperacetate may be used. It is preferred that any mineral acid, such as free sulfuric acid, which may be present in the organic peracid be neutralized with an alkaline material such as sodium acetate. The reason for this is that free mineral acid may tend to cause the breaking of the epoxide ring structure thereby decreasing the yield of desired product. Atmospheric pressure and normal room temperature or slightly elevated temperatures in the range of 25 to 100° C. are very satisfactory for the production of the diepoxides of this invention. It is further preferred that a molar excess of oxidizing material in the range of 2.1 to 3.5 moles of peracid or other epoxidizing agent/mole of codimer be utilized.

The following examples present data obtained in the laboratory on the preparation of the new compositions of matter of this invention.

EXAMPLE 1

*Preparation of cyclopentadiene butadiene codimers*

| Run | A | B | C |
|---|---|---|---|
| Charge, Moles: | | | |
| Cyclopentadiene[a] | 4.55 | 4.45 | 7.3 |
| Butadiene | 6.46 | 5.40 | 5.8 |
| Benzene (diluent) | 0 | 4.22 | 0 |
| Conditions: | | | |
| Temperature, °C | 150–187 | 150–192 | 150–210 |
| Contact Time, Hours | 2¾ | 1¼ | 1 |
| Recovered, Wt., percent: | | | |
| Vinylcyclohexene | 16 | 17 | 12 |
| Vinyl Bicycloheptene[b] | 23 | 22 | 14 |
| Bicyclo Nonadiene[c] | 19 | 23 | 25 |
| Residue[d] | 96 | 98.5 | 95 |
| Total | 96 | 98.5 | 95 |

[a] Charged as dimer.
[b] Boiling point 56–68° C./50 mm., mostly 59–62° C./50 mm.; these are equivalent to 135–150° C./760 mm., mostly 139–142° C./760 mm. Density 20° C./4 0.88, $n_D^{20}$ 1.4801.
[c] Boiling point 68 to 80° C./50 mm., mostly 76–78° C./50 mm.; these are equivalent to 150–162° C./760 mm., mostly 158–160° C./760 mm. Density 20° C./4 0.92, $n_D^{20}$ 1.4973.
[d] Boiling point above 80° C./50 mm. or 162° C./760 mm.

EXAMPLE 2

*Preparation of diepoxide of bicyclononadiene*

Bicyclononadiene was epoxidized with 40% peracetic acid as follows. To a mixture of 350 gms. of benzene and 60 gms. of bicyclononadiene was added 194 gms. of 40% peracetic acid containing 10 gms. of anhydrous sodium acetate. The mixture was stirred and the peracetic acid was added over a 75 minute period while the temperature was kept between 21 to 24° C. After the addition of the peracetic acid the mixture was stirred an additional 2 hours at 21 to 24° C. The two phases were then separated and the hydrocarbon phase washed with 2% aqueous caustic and distilled. The product which boils at 97–100° C. at 7 mm. pressure was obtained in a yield of about 42%. The product analyzed as follows: C 70.1%, H 8.1%, O 21.8%, theoretical C 71.0%, H 7.9%, O 21.1%. The oxirane ring analysis gave a value of 13.2 meq./gm. (theoretical 13–15). It had a $d^{20°\ C.}/4$ 1.15 and $n_D^{20°\ C.}$ 1.4980.

EXAMPLE 3

*Preparation of diepoxide of vinyl bicycloheptene*

To a mixture of 350 ml. of benzene and 76.2 gm. of vinyl bicycloheptene was added 228 gm. of 40% peracetic acid containing 10 gms. sodium acetate. The peracetic acid was added drop by drop over a 30 minute period. After the addition of the peracetic acid the mixture was stirred an additional 2 hours at 20–25° C. The two phases were separated and the hydrocarbon was washed with 2% aqueous caustic and distilled. Two fractions were obtained, a monoepoxide, 2-vinyl-5,6-epoxybicyclo (2,2,1)-heptane, and a diepoxide, 2-(1,2 epoxyethane)-5,6-epoxybicyclo (2,2,1)-heptane. The monoepoxide which was obtained in about a 55% yield boiled at 53–56° C./4.5 mm. The diepoxide boiled at 94–97° C./4 mm., it had a $d^{20°\ C.}/4$ 1.17 and $n_D^{20°\ C.}$ 1.5049. The yield of diepoxide was about 25%. This can of course be increased by recycling the monoepoxide.

EXAMPLE 4

*Reactivity of oxirane rings test*

To determine whether both oxirane rings are of equal reactivity the diepoxide of bicyclononadiene was reacted with hydrogen chloride dissolved in tetrahydrofuran. An excess of hydrogen chloride was used and the unreacted hydrogen chloride titrated with standardized base. For comparison a diepoxide of dicyclopentadiene which contains two oxirane rings of unequal reactivity was also run. The results were as follows:

| Diepoxide | Oxirane Ring, mil. ep. base/gm. | | |
|---|---|---|---|
| | Reaction Times | | |
| | 30 min. | 90 min. | 180 min. |
| Bicyclononadiene[a] | 12.2 | 12.4 | 12.6 |
| Vinyl bicycloheptene[a] | 6.5 | | 7.0 |
| Dicyclopentadiene[b] | | 4.3 | 5.3 |

[a] Theoretical 13.15.
[b] Theoretical 12.2.

EXAMPLE 5

*Polymerization of 2,3-5,6-diepoxybicyclo (4,3,0) nonane*

To determine whether or not the diepoxides will polymerize, which serves as an indication of the reactivity of the two oxirane rings, the following experiment was carried out. A mixture of 25 gms. of diepoxide and 5 gms. of tetraethylene pentamine, a commercial curing agent for epoxy resins, was heated to 180° C. for 30 minutes. At the end 30 minutes the entire mixture turned into a hard resin like material.

What is claimed is:
1. A compound of the formula

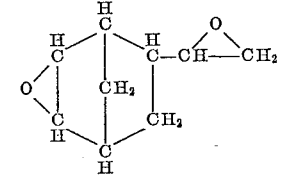

2. A compound of the formula

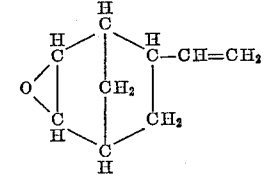

References Cited by the Examiner

UNITED STATES PATENTS

| | | | |
|---|---|---|---|
| 2,537,638 | 1/51 | Kitchen | 260—666 |
| 2,543,419 | 2/51 | Niederhauser | 260—348 |
| 2,752,403 | 6/56 | Schutze et al. | 260—666 |
| 2,776,301 | 1/57 | Payne et al. | 260—348.5 |
| 2,785,185 | 3/57 | Phillips et al. | 260—348.5 |
| 2,786,067 | 3/57 | Frostick et al. | 260—348 X |
| 2,882,279 | 4/59 | Luvisi et al. | 260—348 |
| 2,927,934 | 3/60 | Greenspan et al. | 260—348.5 X |

FOREIGN PATENTS 187,900  12/56  Austria.

OTHER REFERENCES

Swern: Chem. Reviews, vol. 45, pp. 1–68 (1949).
Greenspan: Modern Plastics, vol. 1, pp. 123, 202, 204.

IRVING MARCUS, *Primary Examiner*.

H. J. LIDOFF, WALTER A. MODANCE, *Examiners*.